(12) United States Patent
Jee

(10) Patent No.: US 6,638,640 B2
(45) Date of Patent: Oct. 28, 2003

(54) MULTI-LAYERED METAL PLATE WITH EXCELLENT DAMPING CAPACITY

(75) Inventor: Kwang-Koo Jee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/118,752

(22) Filed: Apr. 9, 2002

(65) Prior Publication Data
US 2002/0150782 A1 Oct. 17, 2002

(30) Foreign Application Priority Data
Apr. 12, 2001 (KR) ................................. 2001-0019676

(51) Int. Cl.[7] ............................. B32B 15/01; F16F 7/00; F16F 15/00
(52) U.S. Cl. .................... 428/594; 428/925; 181/208; 228/178
(58) Field of Search ................................. 428/594, 925, 428/615, 686; 181/208; 228/178

(56) References Cited

U.S. PATENT DOCUMENTS

| | | | | |
|---|---|---|---|---|
| 2,724,454 A | * | 11/1955 | Rowe | 181/208 |
| 3,087,568 A | * | 4/1963 | Kurtze | 181/290 |
| 3,851,724 A | * | 12/1974 | Banks, Jr. | 181/208 |
| 4,296,830 A | * | 10/1981 | Rossander et al. | 181/208 |
| 5,291,801 A | * | 3/1994 | Hanada et al. | 74/606 R |
| 5,347,810 A | * | 9/1994 | Moore, III | 60/323 |
| 5,528,005 A | * | 6/1996 | Bschorr et al. | 181/208 |
| 5,631,451 A | * | 5/1997 | Torisaka et al. | 181/207 |

FOREIGN PATENT DOCUMENTS

| | | | |
|---|---|---|---|
| GB | 2088027 | * | 6/1982 |
| JP | 4-66022 | * | 3/1992 |
| JP | 4-091877 | * | 3/1992 |
| JP | 11-254583 | * | 9/1999 |
| JP | 2001-323964 | * | 11/2001 |
| JP | 2002-078293 | * | 3/2002 |

* cited by examiner

*Primary Examiner*—John J. Zimmerman
(74) *Attorney, Agent, or Firm*—Scully, Scott, Murphy & Presser

(57) ABSTRACT

A multi-layered metal plate with excellent damping capacity and particularly, to a multi-layered metal plate with excellent damping capacity and a method for manufacturing it, is less costly since the plate can be simply manufactured by simply attaching a thin plate on a main metal plate by the methods such as welding and the like, has excellent damping capacity and especially can be easily shaped. In addition, in the plate, the secondary plate is attached on one or both surfaces of the main metal plate.

9 Claims, 2 Drawing Sheets

MULTI-LAYERED METAL PLATE WITH EXCELLENT DAMPING CAPACITY

BACKGROUND OF THE INVENTION

1. Field of the Invention

The present invention relates to a multi-layered metal plate with excellent damping capacity and particularly, to a multi-layered metal plate with excellent damping capacity and a method for manufacturing it, which is less costly since the plate can be manufactured by simply attaching a thin plate on a main metal plate by the methods such as welding and the like, has excellent damping capacity and especially can be easily shaped.

2. Description of the Background Art

To damp vibration and noise of a metal structure, various technologies have been developed. Many kinds of high damping alloys which absorbs vibration by an internal friction by itself, have been developed. However, they are not commonly used since mostly the high damping alloys are non-ferrous alloys and are very costly, there is no alloy which satisfies all properties of damping effect, mechanical characteristic, plasticity and the like. A steel plate made by inserting resin and the like between two metal plates, so called a sandwich steel plate has better damping capacity and mechanical properties, but it is costly and has bad plasticity and weldability, thus to be limited to be applied.

Also, recently, a composite plate made by inserting thin Cu or Al between two plates, are developed, but it has bad damping capacity and bad plasticity and accordingly, it is not widely used.

SUMMARY OF THE INVENTION

Therefore, the present invention provides a multi-layered metal plate with excellent damping capacity and a method for manufacturing it, which is less costly since the plate can be simply manufactured by simply attaching a thin plate on a main metal plate by the methods such as welding and the like, has excellent damping capacity and especially can be easily shaped.

To achieve these and other advantages and in accordance with the purpose of the present invention, as embodied and broadly described herein, there is provided a multi-layered metal plate with excellent damping capacity, made by attaching a secondary plate with a thickness less than one fifth of the thickness of a main metal plate, onto the main metal plate.

Also, in accordance with the present invention, there is provided a method for manufacturing a multi-layered metal plate with excellent damping capacity having a curvature, including the steps of processing a main metal plate to have a predetermined curvature corresponding to the preferable usage and attaching a secondary plate having a thickness less than one fifth of the thickness of a main metal plate, onto the main metal plate.

The foregoing and other, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
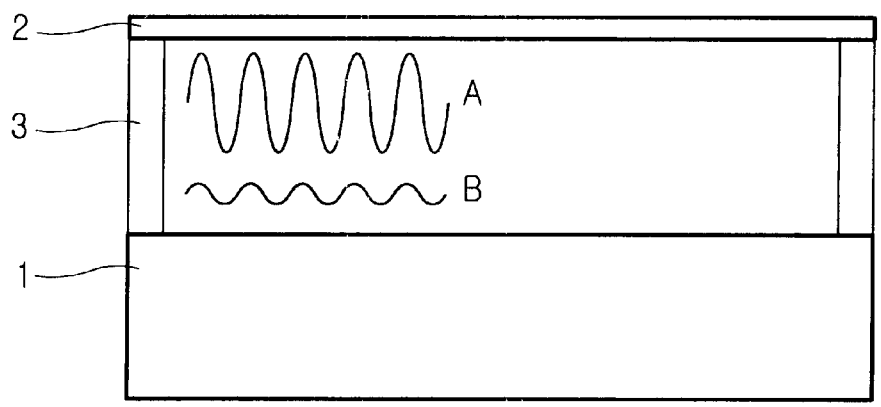
FIG. 1 is a view illustrating the principle of vibration damping in accordance with the present invention.

First, to describe the principle of damping, it is supposed that a thin secondary plate 2 be joined onto a thick main plate 1 made of metal as in FIG. 1. A connection unit 3 is installed to separate the two plates.

When an impact and vibration are applied from the outside, the main plate 1, secondary plate 2 and connection unit 3 which vibrate together and the vibration displacement B of the thick main plate is small and the vibration displacement A of the thin secondary plate is large. At this time, when the vibration is restrained by the methods such as a method of putting a hand on the secondary plate and the like, the vibration of the thick main plate is also restrained.

If the distance between the main plate and the secondary plate is very short, the secondary plate collide with the main plate and can not vibrate. Therefore, vibration of the main body of the unified main plate disappears in a very short time, thus to show very excellent damping capacity. It is desirable that the spacing between the main plate and secondary plate is 0.01 mm~3 mm, and more preferably, 0.1 mm~0.5 mm. If the spacing is longer than 3 mm, the damping capacity is decreased and if shorter than 0.01 mm, the two plates are almost abutted to each other, thus to be unified.

Figure 2:
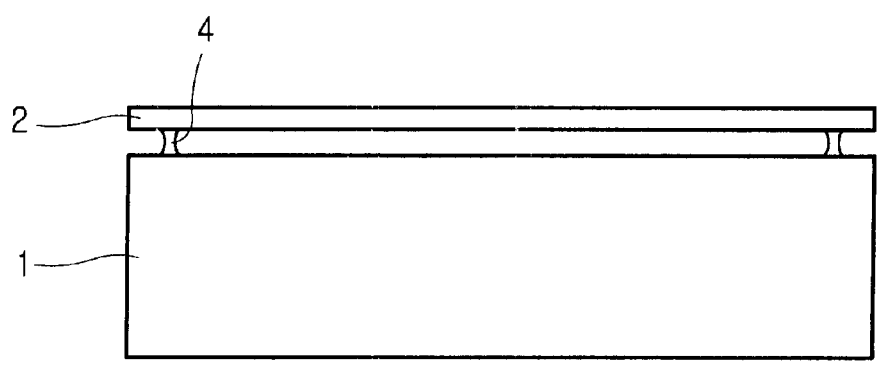
FIG. 2 is a view illustrating basic construction of a multi-layered metal plate with excellent damping capacity in accordance with the present invention.

FIG. 2 is a view illustrating basic construction of a multi-layered metal plate with excellent damping capacity by forming a spot welding unit 4 to have a shorter distance between the main plate and secondary plate in accordance with the present invention.

To detect an efficient thickness ration between the main plate and secondary plate, vibration damping capacity was examined according to the thickness ratio. The secondary plate is combined to one side of the main plate with thickness 3 mm, width 15 mm and length 100 mm by spot welding at 80 mm spacing. An amplitude is measured by attaching a strain gage sensor on the main plate. From here, an average logarithmic decrement δ is obtained from the number of vibration that the vibration variation is attenuated from $5 \times 10^{-4}$ to $5 \times 10^{-6}$. For instance, if the number of vibration is 38, the logarithmic decrement becomes 0.12 since $\ln(5 \times 10^{-4}/5 \times 10^{-6})=4.6$.

Figure 3:
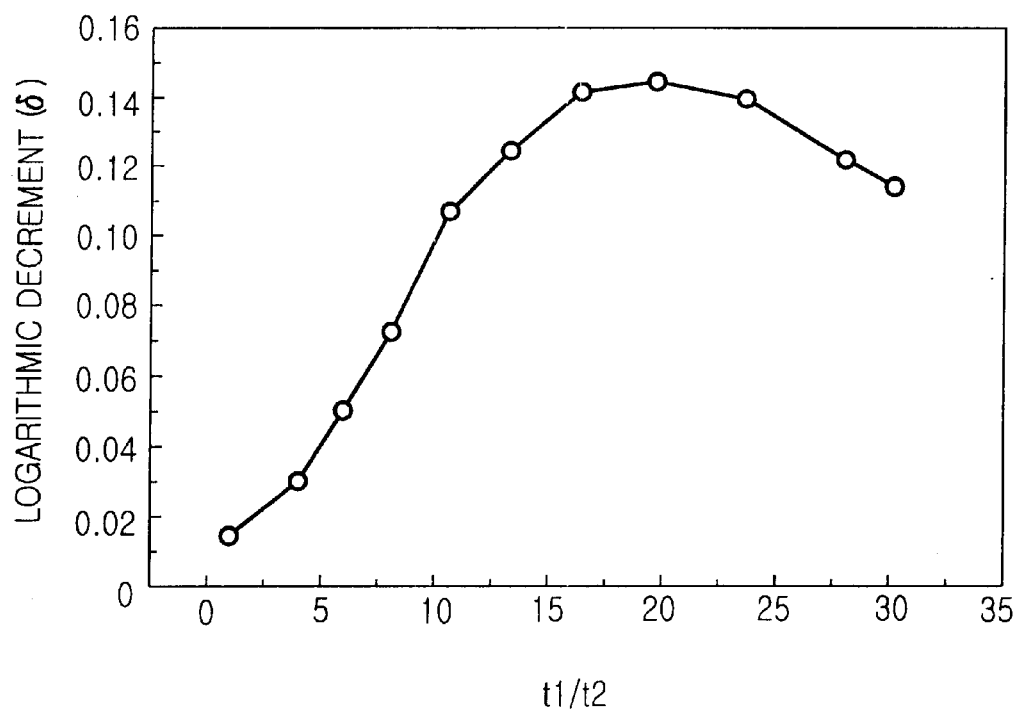
FIG. 3 is a graph illustrating variation of the damping capacity according to the thickness ratio between the main plate and the secondary plate in accordance with the present invention.

FIG. 3 is a graph illustrating variation of the damping capacity according to the thickness ratio between the main plate and the secondary plate in accordance with the present invention. Under the condition that that the thickness of the main plate is t, and the thickness of the secondary plate is $t_2$, when the increased vibration damping capacity goes beyond a threshold limit value as the rate $t_1/t_2$ increases, the damping capacity is again decreased.

If the thicknesses of the two plates are similar (namely, if the ratio of $t_1/t_2$ is close to 1), interference effect by impact and the like is faint since displacement is low in vibrating.

As the ratio $t_1/t_2$ increases, that is, as the difference of the thickness is increased (as the thickness of the secondary plate is thinner), the damping capacity is increased in the early stage since the damping capacity by interference is increased since the displacement of the secondary plate is increased. From the point that the $t_1/t_2$ value is 5, the damping capacity is substantially increased and maximized near the point that the value is 20. After the point, the damping capacity is decreased since the power for restraining vibration of the main plate becomes weaker due to decrease of the mass effect of the secondary plate.

When $t_1/t_2$ value is higher than 30, increase in weight is small as the secondary is thin and shaping of the plate becomes easier, thus to simplify the manufacturing of the product. When taking the above point into consideration, the method is very commercially useful even if the damping capacity is little bit decreased.

The construction with excellent damping capacity can be manufactured by attaching a thin metal plate with a thickness less than one fifth of the main plate using the spot welding method and the like and there is no limit in the materials.

The construction of the present invention, has an advantage that the damping capacity is excellent, forming is very easy since the thickness of the secondary plate is smaller than that of the main plate. For the usage, all metal plates which has a problem of vibration can be replaced and particularly, compressor shell, disc drive case, car components and the like.

It is difficult to form the composite plates, which are spot welded before flex strained processing of a conventional sandwich plate the two or more plates having similar thickness, since the inner side plate is pressurized and the outer plate is tensile strained in the flex strained processing. However, with the present invention, the thin secondary plate can additionally be attached on the main plate processed by the flex strained processing, thus to solve the above problem.

For instance, when the tube is manufactured, the sandwich plate must be welded after the flex strained processing, but in accordance with the construction of the present invention, a secondary plate is attached on a readymade normal tube by spot welding, thus simplifying the manufacturing.

Also, in case of a circular saw in which flatness is important, if two or more plates having similar thicknesses are welded and ground to adjust the thickness, the flatness is poor, increasing the noise. In accordance with the present invention, the manufacturing is simplified by attaching a thin secondary plate on a ready-made normal circular saw.

The construction of the present invention is very simple, has excellent damping capacity and particularly, the plasticity is excellent, thus to be expected that it will be widely applied to the fields of electronics, car components and machine parts.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A multi-layered metal plate with excellent damping capacity, made by attaching a secondary plate having a thickness smaller than one fifth of the thickness of a main metal plate, onto the main metal plate so that the spacing between the two plates becomes 0.01 mm~3 mm.

2. The plate of claim 1, wherein the spacing between the secondary plate and the main metal plate is 0.1 mm~0.5 mm.

3. The plate of claim 1, wherein the secondary plate is attached on the both surfaces of the main metal plate.

4. The plate of claim 1, wherein the thickness of the secondary plate is one fifth~one thirtieth of the thickness of the main metal plate.

5. A method for manufacturing a multi-layered metal plate with excellent damping capacity, comprising the steps of:

processing a main metal plate to have a predetermined curvature corresponding to the preferable usage;

attaching a secondary plate having a thickness smaller than one fifth of the thickness of a main metal plate, onto the main metal plate so that the spacing between the two plates becomes 0.01 mm~3 mm.

6. The method of claim 5, wherein the secondary plate is attached on a surface of the main metal plate.

7. The method of claim 5, wherein the secondary plate is attached on the both surfaces of the main metal plate.

8. The method of claim 5, wherein attachment of the secondary plate uses the spot welding method.

9. The method of claim 5, wherein the shape of the processed main metal plate is a tube shape.

* * * * *